United States Patent [19]

Yoshida

[11] 4,420,816

[45] Dec. 13, 1983

[54] ELECTRONIC WORD RETRIEVAL DEVICE FOR SEARCHING AND DISPLAYING ONE OF DIFFERENT FORMS OF A WORD ENTERED

[75] Inventor: Kunio Yoshida, Nara, Japan

[73] Assignee: Sharp Kabushiki Kaisha, Osaka, Japan

[21] Appl. No.: 89,236

[22] Filed: Oct. 29, 1979

[30] Foreign Application Priority Data

Oct. 31, 1978 [JP] Japan .................. 53-150556[U]

[51] Int. Cl.³ .............................................. G06F 15/38
[52] U.S. Cl. .................................................... 364/900
[58] Field of Search ... 364/200 MS File, 900 MS File

[56] References Cited

U.S. PATENT DOCUMENTS 3,932,859  1/1976  Kyriakides .................. 340/324 R
4,158,236  6/1979  Levy ................................ 364/900
4,159,536  6/1979  Kehoe et al. .................... 364/900

OTHER PUBLICATIONS

U.K. Patent Application GB 2014765A, Filed Nov. 30, 1978 by Jung-Eui Son et al.

*Primary Examiner*—Gareth D. Shaw
*Assistant Examiner*—John G. Mills
*Attorney, Agent, or Firm*—Birch, Stewart, Kolasch & Birch

[57] ABSTRACT

A word information storage and retrieval apparatus comprises a plurality of character keys for entering first word information where a specific word is represented in a first form, a search circuit for searching second word information, and a display for indicating the first form and one or more modified forms of the word entered, and the second word information representing the same meaning and the same language as a first word with the modified forms. The second word information defines the modified forms of the specific word as well as in the first form. A combination of the first form and the modified forms is selected by sequential selection from the following categories: (noun) singular and plural; (pronoun) subjective, genitive, and objective (verb) present, past, and past particle; (adjective) positive degree, comparative degree, and superlative degree; and adjective and adverb.

7 Claims, 2 Drawing Figures

ELECTRONIC WORD RETRIEVAL DEVICE FOR SEARCHING AND DISPLAYING ONE OF DIFFERENT FORMS OF A WORD ENTERED

BACKGROUND OF THE INVENTION

The present invention relates in general to an electronic word retrieval device and, more particularly, to the control circuitry of an electronic word retrieval device for searching and displaying one selected different form (tense, etc). of a word entered by an input means.

Recently, improved portable electronic language translator and electronic dictionaries have been put on the market. U.S. patents relevant to the above type of dictionaries were issued, for example, U.S. Pat. No. 4,158,236 granted to Levy, issued June 12, 1979, entitled "ELECTRONIC DICTIONARY AND LANGUAGE INTERPRETER" and U.S. Pat. No. 4,159,536 to Kehoe, issued June 26, 1979, entitled "PORTABLE ELECTRONIC LANGUAGE TRANSLATION DEVICE."

For those portable electronic dictionaries, it is desirable that a plurality of varied forms of a specific word entered by an input means be automatically searched and then displayed in addition to the original form of that specific word in order to enhance utility of the electronic dictionary.

SUMMARY OF THE INVENTION

Accordingly, it is the primary object of the present invention to provide an improved electronic word retrieval device for automatically searching and displaying a plurality of variant forms of the original form of a word introduced by an input means.

It is a further object of the present invention to provide an improved electronic dictionary containing a control circuit for automatically searching a plurality of variant forms different from the original form of a word and a display for sequentially displaying the plurality of variant forms of the word.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to shose skilled in the art from this detailed description.

To achieve the above objects, pursuant to an embodiment of the present invention, a word information storage and retrieval apparatus comprises a plurality of character keys for entering first word information where a specific word is represented in a first form, a search circuit for searching second word information, and a display for indicating the first form and one or more modified forms, the second word information representing the same meaning and the same language as the first word with the modified forms.

The second word information defines the modified forms of the words to be entered in one memory as well as the originally entered form of the words in another memory.

A combination of the first form and the modified forms is selected in sequence from the following categories: (noun) singular and plural; (pronoun) subjective, gentive, and objective; (verb) present, past and past particle; (adjective) positive degree, comparative degree, and superlative degree; and adjective and adverb.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
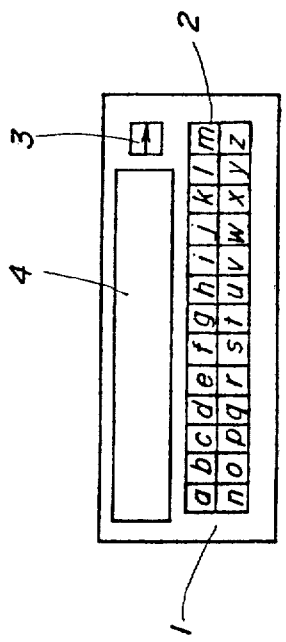
FIG. 1 is a plan view of a portable electronic word retrieval device according to the present invention.

Referring to FIG. 1, a portable electronic word retrieval device of the present invention comprises a body 1, a key unit 2 containing a plurality of alphanumeric character keys, a variant-form search key 3, and a display 4.

A feature of the present invention is that a plurality of variant forms based on an original form of a specific word be subsequently searched and displayed. The term "original form" as used in this specification means an intact alphanumeric character form entered by means of the key unit 2. On the other hand, the term "variant form" as used herein means a modified alphanumeric character form grammatically related to the original form, in a language common to that of the original form and having the same root form with the same root meaning. More specifically, according to an example of the present invention, the following groups are set up between the original form and the variant form of a specific word. The original form and the variant form can be exchanged vice versa.

TABLE 1

| kind of word | original form | variant form | |
|---|---|---|---|
| | | the 1st | the 2nd |
| noun | singular | | plural |
| pronoun | subjective | genitive | objective |
| verb | present | past | past particle |
| objective | positive degree | comparative degree | superlative degree |
| | adjective | | adverb |

Turning back to FIG. 1, a number of the alphanumeric character keys of the key unit 2 are actuated to enter a specific word designated in the above-mentioned original form. The display 4 indicates the specific word in the original form. The variant form search key 3 is actuated whenever one of variant forms based on the original form entered is searched by a control circuit as stated below and simultaneously indicated in the display 4. The variant forms are represented in the same language as the original form.

Figure 2:
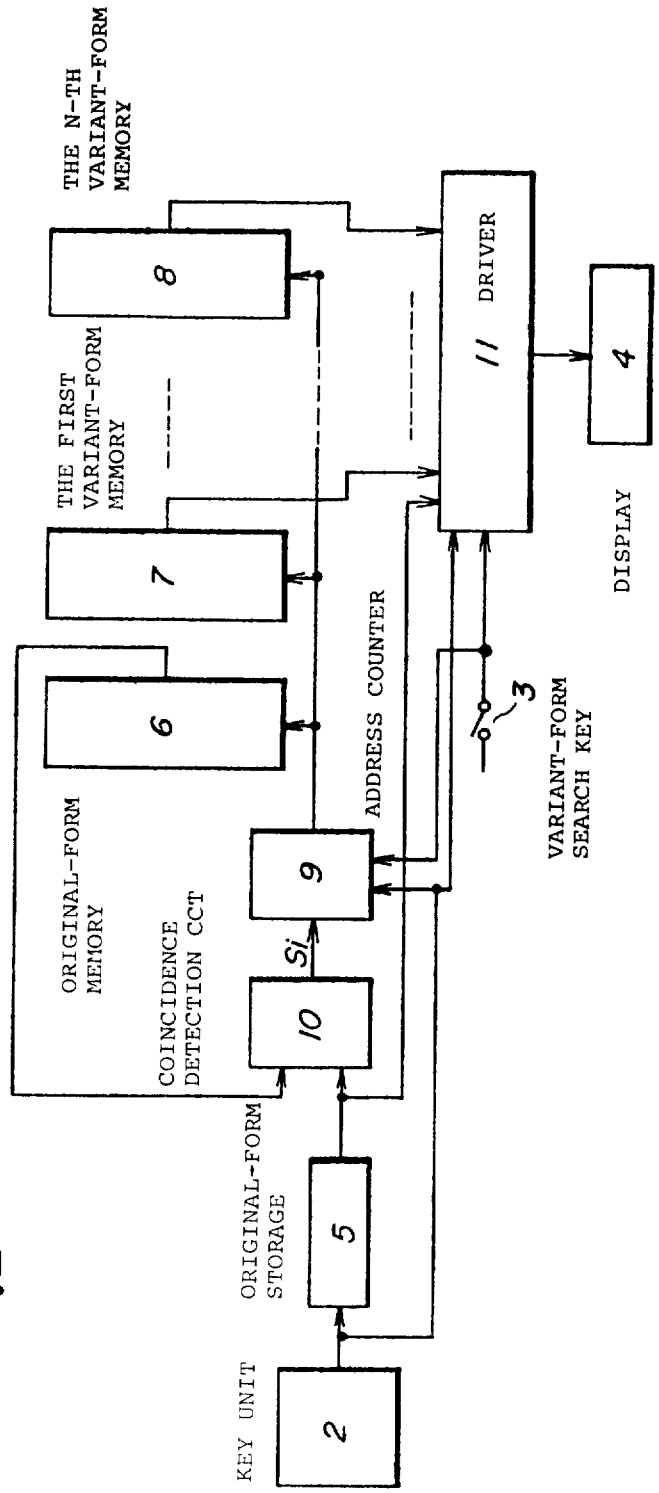
FIG. 2 is a block diagram of a control circuit incorporated within the portable electronic word retrieval device shown in FIG. 1.

FIG. 2 shows a block diagram of the control circuit contained within the portable electronic word retrieval device shown in FIG. 1. The control circuit comprises the afore mentioned key unit 2, the variant form search key 3, the display 4, an original-form storage 5, an original-form memory 6, the first variant-form memory 7, the n-th variant-form memory 8, an address counter 9, a coincidence detection circuit 10 and a driver 11.

The original-form storage 5 contains in turn code information corresponding to alphanumeric character information entered by the actuation of the key unit 2. The original-form memory 6 preliminarily stores a plurality of words in the form of the code information representing the original form. The first variant-form memory 7 previously contains a plurality of words in the form of the code information designating the first variant form grammatically related to the original form. The n-th variant-form memory 8 also in advance stores plurality of words in the form of the code information representative of the n-th variant form (n is an integer more than one) grammatically related to the first variant form.

The address counter 9 causes access of a plurality of addresses of the original-form memory 6, the first variant-form memory 7, and the n-th variant-form memory 8, where it is assumed that the contents stored in an address of these memories 6, 7, and 8, which are simultaneously subjected to access by the address counter 9, are respectively the original form, the first variant form, and the n-th variant form of the same specific word in the same langauge. The coincidence detection circuit 10 determines the coincidence between the code information developed from the original-form storage 5, which represents the intact alphanumeric character form introduced by the key unit 2, and the code information derived from the original-form memory 6, which also indicates the alphanumeric character form.

When the coincidence is obtained, detection signals Si are developed from the coincidence detection circuit 10. The address counter 9 is reset in response to the actuation of the key unit 2. In the reset conditions of the address counter 9, if the variant-form search key 3 is actuated, the address counter 9 advances its counting operations by one, driving the memories 6 to 8 until the detection signals Si are applied to the address counter 9.

The driver 11 controls an indication of the code information derived from the original-form storage 5, the first variant-form memory 7, and the n-th variant-form memory 8. The driver 11 selects a series of the code information to be indicated in the display 4 according to the key unit 2 and the variant-form search key 3. That is, when the key unit 2 is actuated for entering the alphanumeric character form information, the driver 11 transfers the code information from the original-form storage 5 to the display 4. After completion of the entry of the alphanumeric character form information, when the variant-form search key 3 is operated, the drivers 11 subsequently transmits the code information from each of the first variant-form memory 7 and the n-th variant-form memory 8 to the display 4 in synchronization with the actuation of the variant-form search key 3.

The original-form memory 6, the first variant-form memory 7, and the n-th variant-form memory 8 contain the word information in the style of the code information as stated above. A kind of the code information represents a specific word as a whole. According to a second example of the invention, a kind of the code information stored in these memories 6, 7 and 8 may designate a specific character a plurality of which forms in combination a specific word. In this instance, a plurality of kinds of the code information are stored in these memories 6 to 8 in order to facilitate forming a plurality of words. It is necessary that the memory capacity of the memories 6 to 8 be enlarged to be adapted for the second example. However, the coincidence detection circuit 10 and the driver 11 can be simplified by the reduction of memory contained therein.

In operation, the plurality of the alphanumeric character keys of the key unit 2 are operated to introduce the alphanumeric character form information corresponding to a specific word in the original form, e.g., "speak". The address counter 9 becomes reset on the completion of the enter of the alphanumeric character form information. Simultaneously with the entry of the alphanumeric character form information, the code information developed from the original-form storage 5 corresponding to the alphanumeric character form information is admitted to the display 4 through the driver 11.

Therefore, the alphanumeric character form entered is indicated in the display 4, e.g., "speak."

The variant-form search key 3 is operated to find out the variant form identified by the original form to be sought. One actuation of the variant-form search key 3 causes the address counter 9 to count up until a coincidence is obtained between the first code information from the original-form storage 5 and the second code information from the original-form memory 6, and the detection signals Si are generated from the coincidence detection circuit 10 to the address counter 9.

The address counter 9 stops in response to the introduction of the detection signals Si and maintains its counted value at the time when the detection signals Si are to be generated. Since the first variant-form memory 7 and the n-th variant-form memory 8 are both driven according to the counting value set in the address counter 9, it occurs that two kinds of the code information respectively generated from the memories 7 and 8 are the first variant form, e.g., "spoke" and the n-th variant form, say, "spoken."

Instantly, the code information developed from the first variant-form memory 7 is transferred to the display 4 through the driver 11 because the driver 11 is set up in response to the above-described actuation of the variant-form search key 3 so that it conducts the code information from the first variant-form memory 7 into the display 4. Simultaneously with the subsequent actuation of the variant-form search key 3, the n-th variant form defined by the code information developed from the n-th variant-form memory 8 is indicated in the display 4 with the help of the driver 11.

It will be apparent that the variant form may be entered by the key unit 2 to find out the original form related to the variant form. In such a case, a plurality of the variant forms should be stored in the memory 6 whereas a plurality of the original forms corresponding thereto should be contained in one of the memories 7 and 8.

While only certain embodiments of the present invention have been described, it will be apparent to those skilled in the art that various changes and modifications may be made therein without departing from the spirit and scope of the invention as claimed.

What is claimed is:

1. A word information storage and retrieval apparatus comprising:
a plurality of character keys for entering first word information representing a desired word in original form;
search means responsive to said plurality of character keys for searching second word information representing said desired word in a variant form, said search means including;
an original form memory for containing original forms of a plurality of words;

at least one variant form memory for containing variant forms corresponding to said plurality of words;

a counter for producing an incremental count upon the initiation of searching;

a coincidence detector for sequentially comparing said desired word with the original forms of said plurality of words stored in said original form memory;

said coincidence detector comparing said desired word with the original form of a new one of said plurality of words with each increment of said counter, a detected coincidence stopping the incremental count of said counter to thereby allow said counter to produce a signal representative of the original form of the word corresponding to said desired word;

said signal generated by said counter being used to address and recall the variant form of said desired word from one of said at least one variant form memories; and a display responsive to said variant form of said desired word for indicating said second word information.

2. The apparatus as specified in claim 1, which further comprises a control switch for controlling the searching means coincidence detector to thereby search the second word information.

3. The apparatus as specified in claim 1, which further comprises a driver for controlling the transfer of either the original form from the original form memory or a variant form form said at least one variant form memory to the display.

4. The apparatus as specified in claim 1, wherein there are provided a plurality of variant form memories.

5. The word information storage and retrieval system of claim 1, further comprising:

search start means for actuating said search means upon initial actuation of said search start means, subsequent actuations of said search start means driving said search means to address and recall the variant forms of said desired word from different ones of said variant form memories.

6. The word information storage and retrieval system of claim 5, wherein said search start means is a search key.

7. A method of displaying word variants by using a word information storage and retrieval apparatus including input means for entering input information; first storage means for storing a plurality of first information words; second storage means for storing a plurality of second information words, each corresponding to an individual first information word; coincidence detection means for comparing said input information with each of said plurality of first information words to determine the one of said plurality of first information words coinciding with said input information; and means for displaying the one of said second information words corresponding to said one of said plurality of first information words coinciding to said input information, said method comprises the steps of:

entering input information corresponding to an original form of a desired word in a first language;

actuating said apparatus, said first information words corresponding to original forms of a plurality of words in said first language, said second information words corresponding to variant forms of a plurality of words in said first language;

said means for displaying a variant form of said word.

* * * * *